United States Patent
Lim et al.

(10) Patent No.: US 9,756,524 B2
(45) Date of Patent: Sep. 5, 2017

(54) METHOD AND SYSTEM FOR SIGNALING SAVING ON RADIO ACCESS NETWORKS USING EARLY THROTTLING MECHANISM FOR COMMUNICATION DEVICES

(71) Applicants: Heeseon Lim, Cupertino, CA (US); Nishi Kant, Fremont, CA (US)

(72) Inventors: Heeseon Lim, Cupertino, CA (US); Nishi Kant, Fremont, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 0 days.

(21) Appl. No.: 13/972,760

(22) Filed: Aug. 21, 2013

(65) Prior Publication Data

US 2014/0056132 A1  Feb. 27, 2014

Related U.S. Application Data

(60) Provisional application No. 61/691,477, filed on Aug. 21, 2012.

(51) Int. Cl.
*H04W 28/02* (2009.01)
*H04L 12/825* (2013.01)

(52) U.S. Cl.
CPC ......... *H04W 28/0284* (2013.01); *H04L 47/26* (2013.01)

(58) Field of Classification Search
CPC ............................ H04W 28/0284; H04L 47/26
USPC .......................................................... 370/230
See application file for complete search history.

(56) References Cited

U.S. PATENT DOCUMENTS

| | | | | |
|---|---|---|---|---|
| 8,281,382 B1* | 10/2012 | Sanyal | ..................... | H04L 67/22 705/54 |
| 8,429,282 B1* | 4/2013 | Ahuja | ..................... | H04L 47/19 709/219 |
| 9,059,862 B2* | 6/2015 | Shaikh | ..................... | H04L 12/24 |
| 2003/0200317 A1* | 10/2003 | Zeitak | ................... | H04W 16/02 709/226 |
| 2006/0245359 A1* | 11/2006 | Hosein | .................... | H04L 47/10 370/235 |

(Continued)

*Primary Examiner* — Andrew Chriss
*Assistant Examiner* — Ellen Kirillova
(74) *Attorney, Agent, or Firm* — Blank Rome, LLP

(57) ABSTRACT

An intelligent system and a method in a packet network to utilize the radio network resource and the core network resource in an optimized way so that more high priority, critical devices are granted access to the network while throttling the low priority, non-critical devices with the same given resource. The system collects all the necessary information from the signaling exchange between the radio access network and the core network and takes the device subscription characteristics and statically or dynamically defined throttling behavior rules into consideration to choose the optimal behavior to handle the requests from devices at any given time including deciding to reject the requests for certain types of devices under certain network conditions while granting the requests for other types of devices. This early throttling mechanism effectively increases the network resources, especially radio access network resources for high priority devices so that the quality of service does not change for those high priority devices even under network congestion condition.

9 Claims, 5 Drawing Sheets

(56) References Cited

U.S. PATENT DOCUMENTS

2007/0030613 A1* 2/2007 Sousa ................ H04W 52/281
                                                          361/92
2011/0158090 A1* 6/2011 Riley ..................... H04L 12/14
                                                          370/230

* cited by examiner

METHOD AND SYSTEM FOR SIGNALING SAVING ON RADIO ACCESS NETWORKS USING EARLY THROTTLING MECHANISM FOR COMMUNICATION DEVICES

FIELD OF THE INVENTION

The present disclosure relates generally to general packet radio service (GPRS) networks and their evolution including but not limited to Universal Mobile Telecommunication System (UMTS) and Long Term Evolution (LTE) systems. More particularly, this disclosure relates to a method and system for relieving the radio access network (RAN) resources from an extensive signaling load for lower priority communication such as machine-to-machine type communications or where a user explicitly opts in for lower priority treatment for some incentive through an early throttling mechanism for such communications.

BACKGROUND

GPRS, UMTS, and LTE systems are an evolution of the global system for mobile communications (GSM) standard to provide packet switched data services to GSM mobile stations. Packet-switched data services are used for transmitting chunks of data or for data transfers of an intermittent or bursty nature. Typical applications for Third Generation Partnership Project (3GPP) packet service include Internet browsing, wireless e-mail, video streaming, and credit card processing, etc. used by human users.

Organizations both private & government that are local & global are looking for new and innovative ways to manage their business & operations at an optimum cost structure. As the cost of connectivity starts to drop precipitously, they are looking to take advantage of huge efficiency gains through access to data for processing and analysis in an optimized way, which previously was only available through costly human intervention.

These new applications and markets start to emerge that take advantage of ubiquitous cellular coverage. Even though the underlying radio technology continues to evolve from 2G, 2.5G, 3G and now LTE, new innovation is being developed to take advantage of this infrastructure in the form of smart devices and sensors that are creating new market opportunities for Mobile Network Operators (MNOs). Cellular networks are ideal in connecting millions of data collecting devices to the processing infrastructure. The opportunity to connect millions and even billions of devices is creating an exciting market opportunity commonly defined as machine to machine (M2M).

However, as MNOs look to seize this new market opportunity, there are many challenges in adopting the same practices and architecture that were designed for a very different human consumer market model. The cost structure is fundamentally different, the relationship with an Enterprise is fundamentally different and the impact on the network from non-human devices is fundamentally different.

Most machine to machine offerings currently in the market treat the cellular network as a transport pipe. While this approach is simple and can be deployed using existing cellular infrastructure, it ignores the fact that machine type communication needs are inherently different than those for a human subscriber. Lots of machine type communication is more signaling intensive than data intensive; i.e. the amount of data that is communicated between the device and the network is often times very small and there are many signaling exchanges to establish the data channel between the device and the network. Furthermore, a number of machine type communication (MTC) devices can be a lot bigger than that of single user subscribers, e.g. a smart meter deployed in a county could be millions. As the number of connected devices goes up, the network would succumb to signaling overload and possible other forms of congestion, especially in the radio network, impacting the quality of services for high revenue generating human users, not just the machine type devices.

FIG. 1 is a block diagram illustrating how high priority human user devices and low priority machine type devices/opt-in human user devices are handled the same way over GPRS network architecture. Referring to FIG. 1, machine type devices/opt-in human user devices 101 and high priority human user devices, e.g. smart phones 102, are communicatively coupled to a packet core network 110. For example, machine type device/opt-in human user devices 101 and high priority human user devices 102 are coupled to the mobile network 110 via a third generation (3G) radio access network through, for example, nodeB (NB) and radio network controller (RNC) for 3G network or enhanced NodeB (eNB) 104 for LTE network, a serving GPRS support node (SGSN) for 3G network or serving gateway (S-GW)/mobility management entity (MME) 105 for LTE network, and a gateway GPRS support node (GGSN) for 3G network or packet data network (PDN-GW) 106 for LTE network. In order for the MTC device 101 to communicate to a MTC application server located in other networks such as Internet and/or Enterprise premises 122, machine type devices 101 go through packet core network 110, which relays communications between a machine type user equipment (UE) 101 and a destination (e.g. Enterprise server 122).

The MTC devices/opt-in human user devices 101 and the high priority human user devices 102 are treated as one user equipment equally at the packet core network 110 and the radio network 104. When there are low priority MTC devices/opt-in human user devices 101 and the high priority human user devices 102 mixed in some areas, these devices compete for resources regardless of the priority or criticality. For example, both the low priority MTC devices/opt-in human user devices 101 and the high priority human user devices 102 start attach procedure 111 toward the radio network 104. The radio network 104 forwards the attach procedure messages 112 to the serving GPRS support node (SGSN) or Mobility Management Entity (MME) 105. SGSN or MME 105 performs the authentication 113 with Home Location Register (HLR)/Authentication Center (AuC) 107 for each device that requires access to the network. Once the authentication is successful, the SGSN or MME 105 sends attach accept response to the devices. It involves many message exchanges to complete one procedure, e.g. about 7 to 9 messages to complete the attach procedure per node. At the enB or NB 104, it needs to process about 7 messages before the UE is attached and during this time, the resources at the eNB or NB 104 are occupied for that device. Once all the resources at the eNB or NB 104 are used to process multiple procedures from multiple devices, the eNB or NB 104 cannot accept any new requests, i.e. it cannot allow any new devices until the procedures for other device(s) are completed and resource becomes available 114.

If there are lots of low priority MTC devices/opt-in human user devices 101 in the area, high priority human user devices 102 need to compete with those low priority devices 101 for radio network resources. Once the radio network resource is fully occupied, the request for access from the UE will be dropped at the radio network. In the case where there are 50:50 number of low priority devices and the high priority devices, and if the low priority devices 101 have requested the access at the same time and occupies the radio network resources, some of the high priority devices 102 as well as the low priority devices 101 will be rejected from access to the radio network until a whole procedure between the device and the network is completed, which takes up about 7 to 10 message exchanges in total.

The problem of this model is that the high priority devices and the low priority devices will be treated the same and the high priority human user devices 101 and/or critical MTC devices will be competing with low priority non-critical MTC devices or opt-in low priority human user devices. Radio spectrum is an expensive and rare resource for the mobile operators and supporting the low priority devices could result in deteriorated quality of service for the high priority users, especially as the number of MTC devices grow exponentially, to millions and billions. There are some attempts in standard bodies to address this issue by upgrading the radio network devices 104 and the low priority devices 101. However, since this involves change at the devices 101 and the radio network devices 104, it will be very costly for operators and it will also take time to actually deploy the proposed solution.

SUMMARY

An aspect of the disclosure herein is an intelligent system and method which may be located at a core network to selectively complete the requested procedure by rejecting the first request from low priority, non-critical devices to reduce the amount of signaling in the radio access network and core network is defined. The system may store the priority and the criticality of each device at device level and/or device group level, monitor the load at the radio network as well as the core network, and takes the subscription characteristics and policy information into consideration to decide whether to accept the initial request and proceed with the procedure or throttle the requests from the low priority devices to free up radio network resources for other higher-priority devices.

In another aspect of the disclosure, the system makes a decision based on a plurality of factors including system load, ratio of high priority vs. low priority devices, and early throttle level, etc. If there are lots of low priority devices requesting to attach or packet data protocol (PDP) context activation while the radio network is congested, the network may decide to throttle 50% of the requests initiated by low priority devices, resulting in 25% more resources to accommodate requests from high priority human user device, which would've been rejected otherwise.

This type of early throttling can happen at each network node or even further consolidated into one network node. The embodiments described herein support both modes. Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

DETAILED DESCRIPTION

In the following description, numerous details are set forth to provide a more thorough explanation of embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

According to some of the embodiments described herein, a mechanism is provided to throttle the low priority devices in the core network and the radio access network thus saving expensive radio resources as well as saving the processing resources at the core network, which results in more accesses for higher priority devices. In one embodiment, a virtual optimized core (VOC) is configured to handle all the procedures to support mobility/session management, authentication/authorization, and data processing for the machine type devices as one logical core network node. The VOC includes the control plane and user plane processing functionalities and the subscription data/policy data storage functionalities to support the aforementioned procedures. The term priority is used herein to indicate the importance or order based on the nature of subscription or device types (for example human users vs. machine type devices). The term criticality is used herein to indicate the importance of the mission the devices are performing (for example utility measuring device vs. life support device). Throughout this application, MTC devices are used as an example of low priority devices, but MTC devices represent other types of low priority, non-critical devices as well including opt-in human user devices. Throughout this application, human user devices are used as examples of high priority devices, but human user devices represent other types of high priority, critical devices as well including health monitoring devices.

Figure 1:
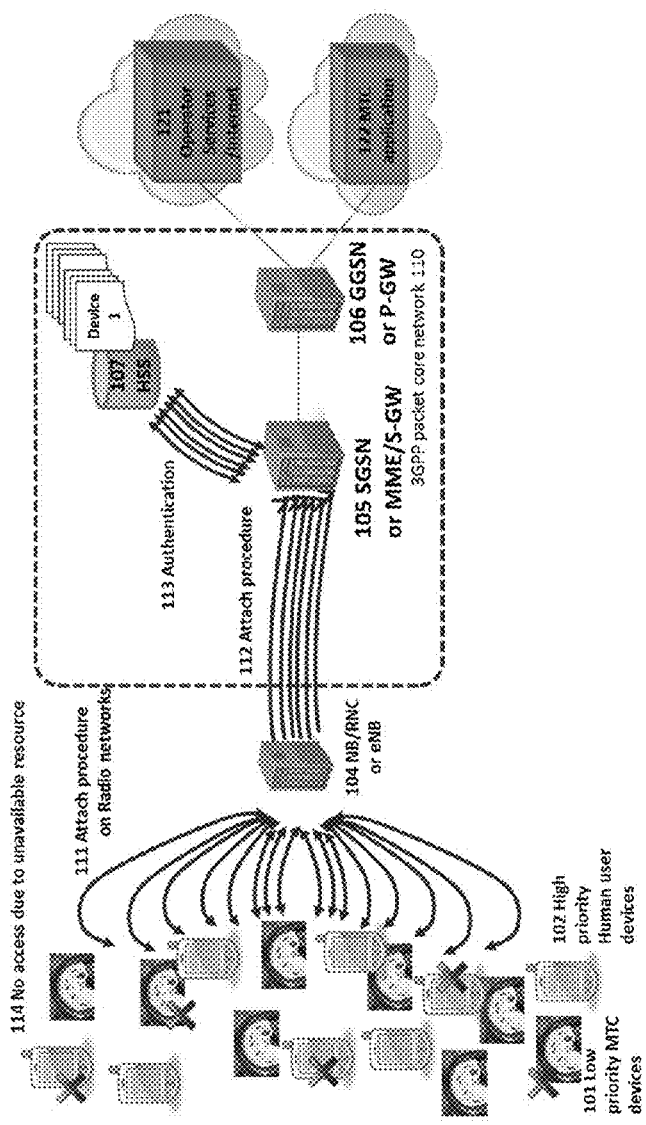
FIG. 1 is a block diagram illustrating network congestion and access reject for both machine type communications devices and human user devices over typical 3$^{rd}$ Generation Partnership Project (3GPP) packet core.

FIG. 1 is a block diagram illustrating the adverse impact caused by introduction of a large number of low priority devices (e.g. MTC devices or opt-in low priority human user devices) in the network and preventing the network from granting access to the high priority human users over 3GPP network architecture. Referring to FIG. 1, low priority machine type devices 101 and high priority human user devices, e.g. smart phones 102, are communicatively coupled to a 3GPP mobile network 110. For example, low priority devices 101 and human user devices 102 are coupled to the 3GPP packet core network 110 via a radio access network through, for example, nodeB or NB and radio network controller (RNC) for 3G network and eNB for LTE network 104, a serving GPRS support node (SGSN) for 3G network or serving gateway (S-GW) for LTE network 105 and a gateway GPRS support node (GGSN) for 3G network or packet data network (PDN-GW) for LTE network 106. In order for the MTC device 101 to communicate to MTC application servers 121/122 located in other networks such as Internet and/or Enterprise premises, machine type devices 101 go through 3G mobile network 110, which may relay communications between a machine type UE 101 and a destination (e.g. Enterprise servers 121/122). With this traditional 3G core network, both MTC devices 101 and human user devices 102 are treated in the same way for the attach request or PDP context activation request and can result in rejected access for both MTC devices and human user devices during network congestion, while the impact for access reject for high priority human user devices is much more severe than for low priority MTC devices.

Figure 2:
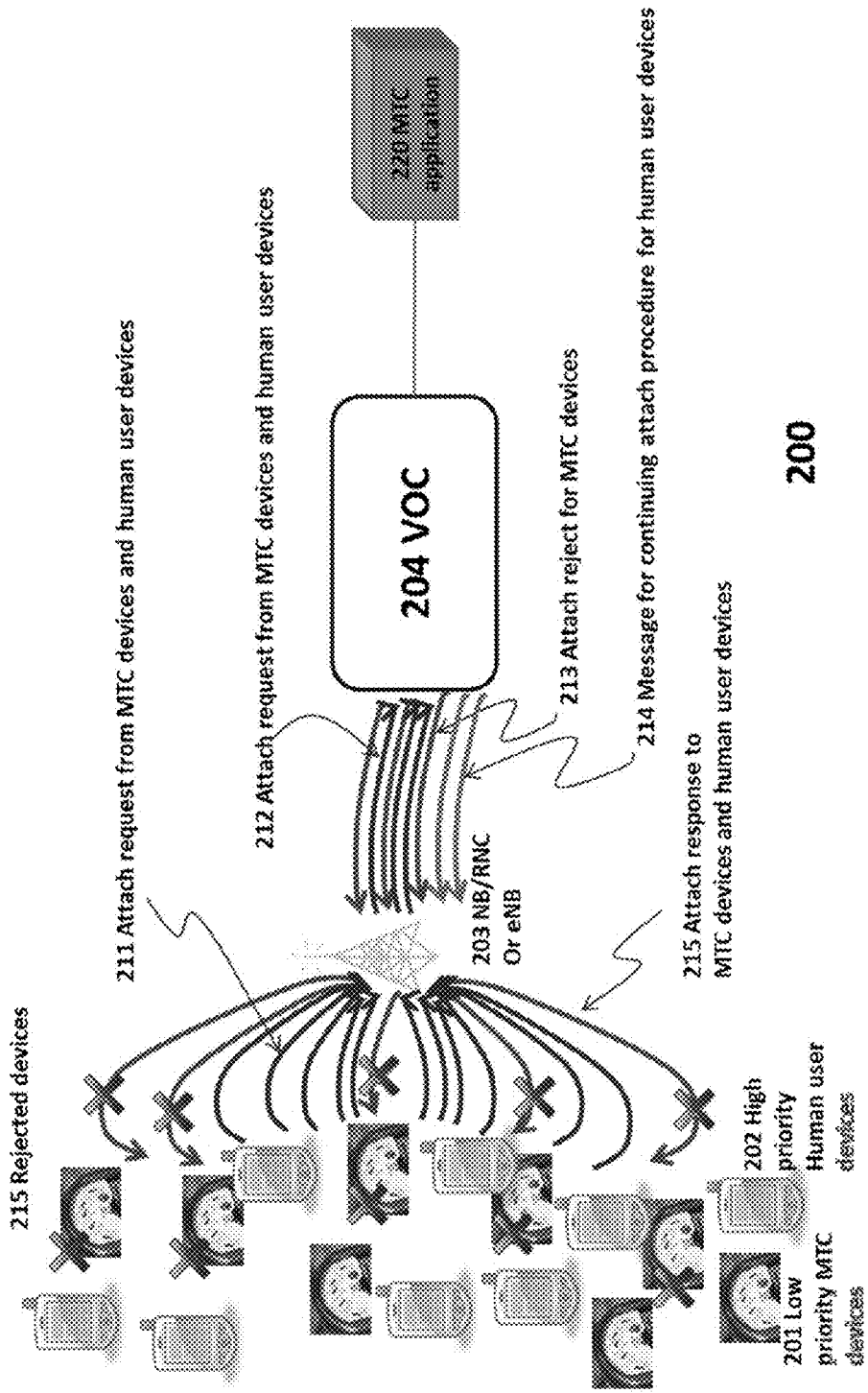
FIG. 2 is a block diagram illustrating system according to one embodiment.

FIG. 2 is a block diagram illustrating a network configuration 200 according to one embodiment of the invention. Referring to FIG. 2, wireless user equipment for low priority machine type communications (MTC UEs) 201, shown here as a utility sensor, are communicatively coupled to a virtual optimized core (VOC 204) having collapsed core network functionality with an intelligent early throttling method, to communicate with machine type communication servers and applications (MTC application 220). For example, low priority MTC UE 201 is coupled to the VOC 204 via a radio access network through, for example, nodeB or NB and radio network controller (RNC) for 3G network and eNB for LTE network 203. Low priority MTC UE 201 can be also coupled to the VOC 204 via other types of radio access networks, for example, a Wi-Fi access network.

As VOC 204 is a self-contained core network realization containing all the core network functionalities including SGSN/S-GW/MME, GGSN/P-GW, Home Location Register/Home Subscriber Service (HLR/HSS), and Policy & Charging Rules Function (PCRF), it can communicate to MTC UE 201 via various access networks by simply supporting interfaces towards the access networks, without the need for total core network upgrade or update. For example, when a mobile carrier upgrades the network from 3G to LTE, VOC can support the upgrade by supporting S1 interface from eNB on top of Iu-ps interface from RNC, while all the rest of functionalities remain the same thus removing the need for extensive upgrade for mobile carriers.

In one embodiment, the VOC 204 includes, among others, interface towards radio access network 203, interface towards MTC servers/applications 220, internal device profile in group and individual device level, and an internal method for deciding the early throttling for the MTC devices 201. Interface towards radio access network is designed to support various access networks by providing standard interfaces towards each access network, including 3G, 4G (LTE), or Wi-Fi. Interface towards MTC application is designed to provide communications towards the server at the enterprise and/or packet data network through an optimized application protocol interface (API). Internal device profile includes all the profile information of the device including subscription/mobility/session information and the priority/criticality level, at the group and individual device level. An internal method is designed to decide whether to throttle a device based on the information that is available at the VOC.

The internal method is used to utilize the radio network resources and the core network resources in an optimized way so that more high priority, critical devices are granted access to the network while throttling the low priority, non-critical devices with the same given resource. The method uses a plurality of information criteria (or factors) to make a decision whether to throttle the device or not. The internal method use information such as: access priority, throttle level, current system load, ratio of high priority device and low priority device, etc. for this purpose. Based on the information, internal method makes a decision whether or not it will throttle the device. For example, the internal method may set a rule to throttle 50% of low priority device by rejecting the access request when the system load is higher than 70%. If there are 50:50 ratio of low priority MTC devices and high priority human user devices, 50% of low priority MTC devices, i.e. 25% of total number of devices will be throttled under congested condition. This means 25% of more high priority devices will have access to the network under congested condition. This has the equivalent effect of increasing the network resource by 25%. If, as another example, there are 80:20 ratio of MTC devices and high priority user devices and system is going through a congestion and only 50% of the requests are granted, it means only 10% of the whole resource is allocated for human users and half of human users' access request will be rejected. In this case if the internal method has a rule such that 30% of low priority MTC devices are throttled under congestion scenario, it means 24% (30% of 80%) of total number of devices will be throttled and this 24% resource is available for high priority devices. With this additional 24% resource, all the requests from human user devices are guaranteed to be accepted even under system congestion condition. This has an equivalent effect of increasing the system capacity more than 200% for high priority devices. As the throttling level for low priority devices increases, more resources will be available for high priority users and operators can offer the same level of services to the high priority users while accommodating MTC devices into the system. In the above example, if the throttling level is 80%, 64% of additional resource becomes available, which is more than 600% increase to accommodate high priority devices. As described here, the internal method would control the acceptance level of low priority devices to effectively increase the network resources for high priority devices without actually adding any more physical resources in the network, maximizing the resource utilization especially for high priority users.

When there are many low priority MTC devices and high priority human user devices co-existing in the network, each device competes for resources to get access to the network. The internal method makes an intelligent decision to maximize the resource utilization for high priority devices. As shown in FIG. 1, under network congested condition, either low priority MTC devices or high priority human user devices can be rejected from access regardless of the priority or types of the cell. The VOC's internal method increases the chance of high priority devices being accepted dramatically by performing early throttling for the low access priority devices. The more low priority MTC devices there are in the network and the higher the throttle level is, the more network resources get freed up for high priority user devices under congested network condition.

When the low priority MTC devices 201 and high priority human user devices 202 co-exist in the network and request for access to the network at the same time, causing huge load on the system and network congestion condition, VOC 204 can use several types of information to decide whether to grant access for the request or not. When the network is congested, if low priority MTC devices 201 and human user devices 202 initiate a procedure to request access to the network 211, radio network node 203 forwards this attach request 212 to the VOC 204. When VOC 204 receives the attach request message, it analyzes such factors as the current system load, the ratio of the MTC devices 201 and the human user devices 202 in the network, the traffic model, past traffic trends, and other network conditions and makes a decision whether it has enough resources to grant access to all the requests. If the VOC 204 decides, for example, the system is 60% loaded and there is a possibility that 50% more human user devices can request access in the near future, the VOC 204 starts the throttling process for the low priority MTC devices 201. With the early throttling, the VOC 204 responds with 'attach reject' message 213 to the 'attach request' message 212 sent by MTC devices 201 while proceeding with the attach procedure 214 which may include, for example, authentication procedure, identity procedure, and/or security mode procedure for high priority human user devices 202. The radio network node 203 relays this response from the VOC 204 to each device. For the human user devices 202, the attach procedure will continue and there will be 6 to 9 more messages exchanged between the device and the VOC 204 during which time the radio network and core network resources are occupied. However, for the low priority MTC devices 201, the attach procedure will terminate at the UE with attach reject message sent by the VOC 204, and no more resources at the radio network and the core network are occupied to process this device and the resource can be used for other high priority user devices 202. As a result, only the low priority devices will not have access to the network while all or high percentage of high priority devices are guaranteed access to the network.

Figure 3:
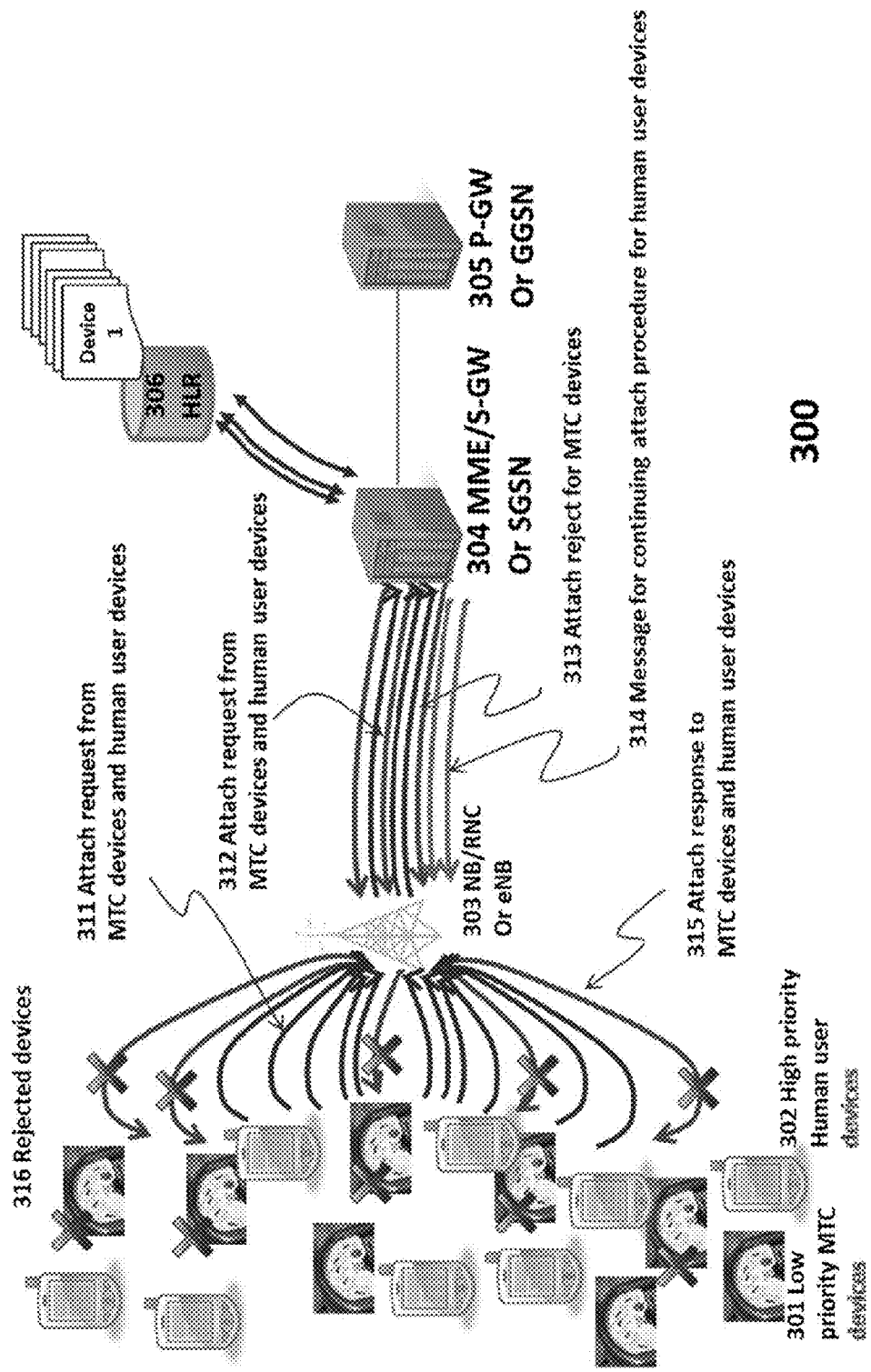
FIG. 3 is a block diagram illustrating a 3GPP packet system according to another embodiment.

FIG. 3 is a block diagram illustrating a network configuration according to another embodiment of the invention. Similar to configuration 200 of FIG. 2, configuration 300 of FIG. 3 includes the intelligent method to decide whether to perform early throttling for low priority devices to maximize the utility of network resources for high priority user devices. In one embodiment, the HLR 306 stores the device profile which includes part of the information to be used in making a decision, e.g. priority and/or criticality of a device. The SGSN for 3G network or MME/S-GW for LTE network 304 is enhanced to include the internal method described in the three preceding paragraphs. The SGSN or MME/S-GW 304 is enhanced to include the early throttling decision method based on a plurality of factors such as current system load, ratio of low priority devices and the high priority devices, traffic model, past traffic trends, throttle level, and other network conditions and to exchange the device information with HLR 306. HLR 306 is enhanced to include priority and/or criticality of the device and to exchange this information with SGSN or MME/S-GW 304 so that the SGSN or MME/S-GW 304 can make a decision on early throttling.

When the low priority MTC devices 301 and high priority human user devices 302 co-exist in the network and request for access to the network at the same time, causing huge load on the system and network congestion condition, SGSN or MME/S-GW 304 can use several types of information to decide whether to grant access for the request or not. When the network is congested, if low priority MTC devices 301 and human user devices 302 initiate a procedure to request access to the network 311, radio network node 303 forwards this attach request 312 to the SGSN or MME/S-GW 304. When SGSN or MME/S-GW 304 receives the attach request message, it fetches the device subscription information including priority and/or criticality of the device from the HLR 306, analyzes the current system load, the ratio of the low priority MTC devices 301 and the high priority human user devices 302 currently attached in the network, the traffic model, past traffic trends, and other network conditions and makes a decision whether it has enough resource to grant access to all the requests. If the SGSN or MME/S-GW 304 decides the system is congested and there is a possibility access request from human user devices is rejected due to low priority MTC devices, the SGSN or MME/S-GW 304 starts the throttling process for the low priority MTC devices 301. With the early throttling, the SGSN or MME/S-GW 304 responds with 'attach reject' message 313 to the 'attach request' message 312 sent by MTC devices 301 while proceeding with attach procedure 314 with, for example, authentication procedure, identity procedure, and/or security mode procedure 314 for high priority human user devices 302. The radio network node 303 relays this response from the SGSN or MME/S-GW 304 to each device. For the human user devices 302, the attach procedure will continue and there will be 6 to 9 more messages exchanged between the device and the SGSN or MME/S-GW 304 during which time the radio network and core network resources are occupied. However, for the MTC devices 301, the attach procedure will terminate at the UE 316 with attach reject message 315 sent by the SGSN or MME/S-GW 304, and no more resources at the radio network and the core network are occupied to process this device and the resources can be used for other high priority user devices 302. As a result, only the low priority devices will not have accesses to the network while all or high percentage of high priority devices is guaranteed access to the network.

Figure 4:
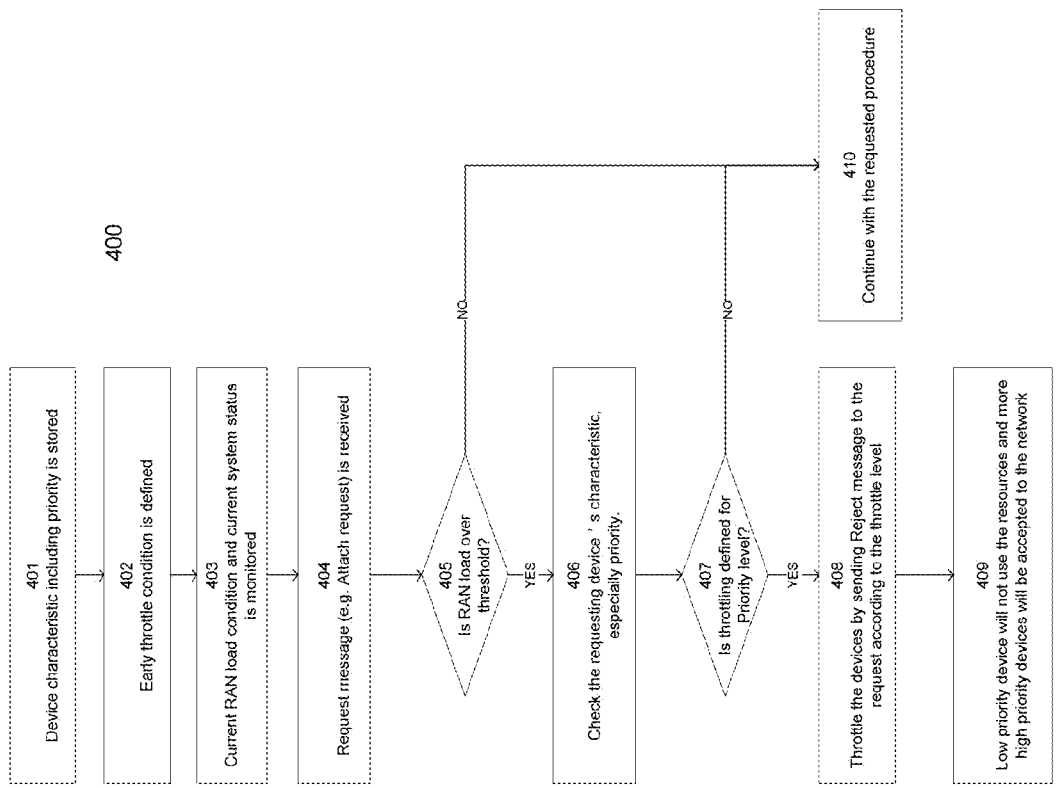
FIG. 4 is a flow diagram illustrating an early throttling process according to one embodiment of the invention.

FIG. 4 is flow diagram illustrating a method for deciding an early throttling for low priority devices under congested network condition in a mobile network according to one embodiment of the invention. Note that method 400 may be performed by processing logic which may include software, firmware, hardware (e.g., processor, controller, memory, etc.), or a combination thereof. For example, method 400 may be performed by VOC 204 of FIG. 2 or SGSN or MME/S-GW 304//HLR 306 of FIG. 3. Referring to FIG. 4, at step 401, device characteristic information is stored along with other subscription information. This information may especially include priority and criticality of the device. In one embodiment, a utility MTC device like smart meters could be characterized as low priority and non-critical device while health-monitoring MTC device could be characterized as high priority and critical device. Human user device like smart phones could be characterized as high priority and non-critical device. It is also possible to have multiple levels of priority. The priority/criticality information of the device and the granularity of priority is defined by the service providers or application providers.

At step 402, early throttle condition is defined. The throttling condition includes the predetermined system load to start the throttling and the throttling level for low priority devices. If there is more than one level of priorities, throttling level for each priority level is defined. The throttling level defines the percentage of throttle rate for the particular priority level. In one embodiment, if a throttling level is defined as 50% for low priority device, it means half of the access requests from the low priority device will be rejected. More granularities are possible by defining the throttling level according to the ratio of low priority MTC devices to the high priority human user devices currently attached to the system. In another embodiment, throttling level is defined as 50% for low access priority devices when the system load higher than 70% and ratio of attached low priority device to high priority device is 50:50 while the throttling level is defined as 80% for low access priority devices when the system load is higher than 70% and ratio of attached low priority device to high priority device is 90:10, etc.

At step 403, current load at radio access network and the system status is constantly monitored. This step is needed to decide whether to trigger the throttling and also to decide the throttling level. This information and the device characteristic defined in step 401 will be used for early throttling decision.

At step 404, attach request from the device to gain access to the network is received. This message is a standard attach request message and the contents are the same for low priority devices and high priority devices. To process the attach procedure, several sub procedures need to happen including authentication procedure, identity procedure, security command procedure, etc. In all, there are about 7 to 10 messages exchanged.

When the attach request is received, at step 405, the radio access network's current load is checked as the monitoring was set at step 403. Current system load is compared against the threshold for throttling defined at step 402. If current system load is lower than the threshold defined at step 402, the throttling does not happen and the requested procedure is continued at step 410. For attach request procedure, this means 7 to 10 message exchanges will happen to grant access to the device that requested the access.

If the current system load is higher than the threshold, then the early throttling is triggered at the system level. To decide the throttle level, at step 406, the characteristic of the device that has requested the access is checked. The characteristic includes priority of the device and/or criticality of the device.

At step 407, priority and/or criticality of the device that had requested access is compared against the throttle level defined at step 402. If the priority/criticality is high and if throttling is not defined for this priority level, the throttling does not happen and the requested procedure is continued at step 410. For attach request procedure, this means 7 to 10 message exchanges will happen to grant access to the device that requested the access. If the throttling is defined for this priority level, the early throttling is triggered for this device. In one embodiment, three levels of priority is defined and if the throttling is defined for priority level 2 (lowest priority) only. If the device that has requested access is priority level 1, there is no throttling for this device and the attach request will be processed normally for this device, while device with priority level 2 will be throttled.

At step 408, throttling level is decided for the device based on the throttle level defined at step 402 and attach reject message is sent to the request according to the throttle level.

In one embodiment, three levels of priority is defined and throttling level is defined as 50% for priority level 2 (lowest priority). If the device that has requested access is priority level 2 and the early throttling decision was made at step 407, half of the requests from the priority 2 devices will be rejected according to the throttling level. This means 1 out of 2 requests from priority level 2 devices will be rejected. Request from those devices will be accepted and processed or rejected based on the throttle level.

At step 409, with the throttling for the lower priority level devices, the resources will be available for higher priority devices. This has the same effect as physically increasing the resources to accommodate more high priority devices. This process continues with every request message received and the proper throttling will happen based on the current system load, system attach status, and the device characteristics.

Figure 5:
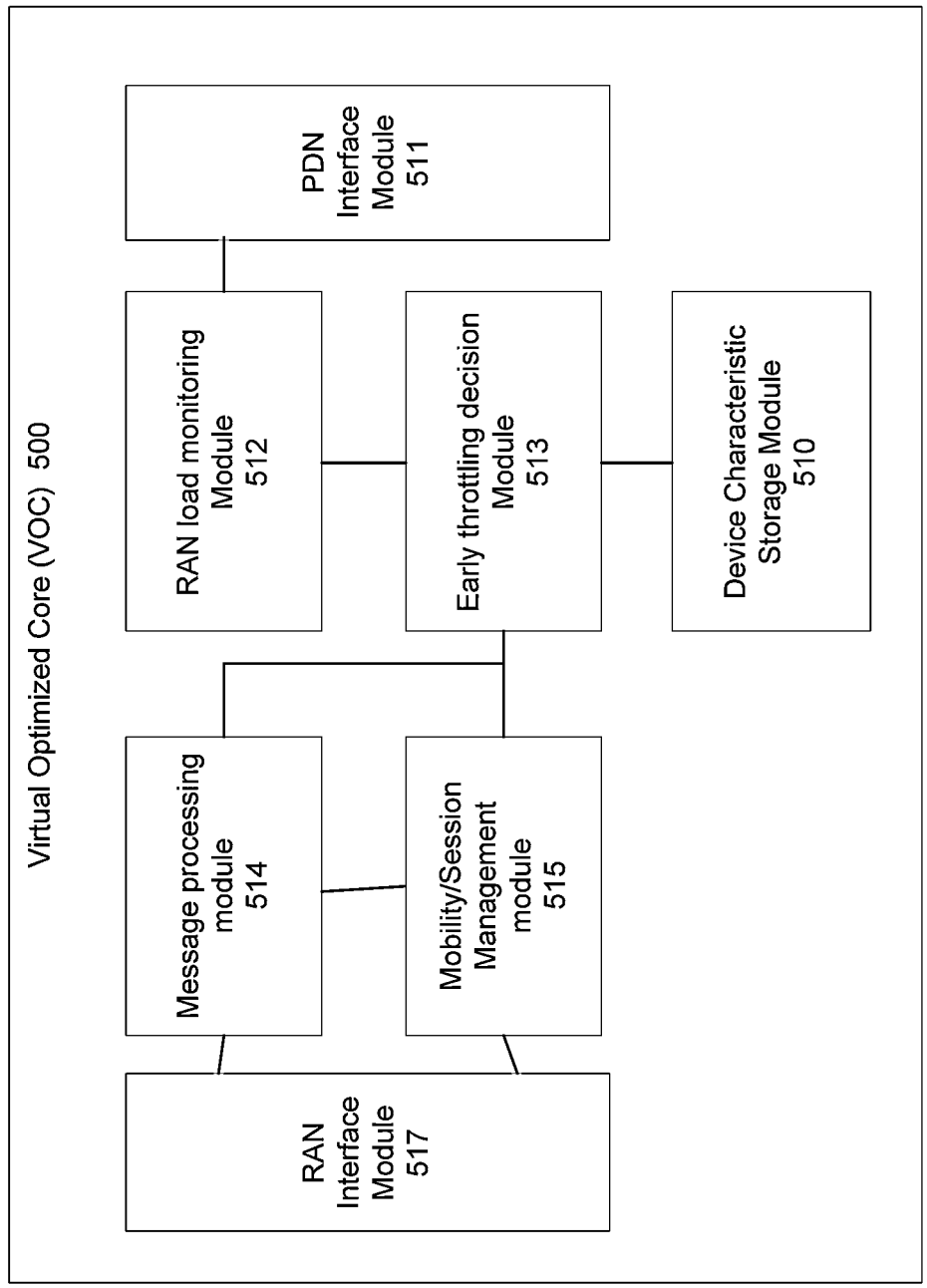
FIG. 5 is a block diagram illustrating a VOC (virtual optimized core) according to one embodiment of the invention.

FIG. 5 is a block diagram illustrating the virtual optimized core (VOC) 500 for processing signaling and user data traffic with intelligent logic to maximize the utilization of the network resources by early throttling mechanism for lower priority devices. Note that system 500 may be performed by processing logic which may include software, firmware, hardware ((e.g., processor, controller, memory, etc.), or a combination thereof. Referring to FIG. 5, at device characteristic storage module 510, all the device characteristics relevant for early throttling are stored, including priority and criticality of each device. The device characteristic storage module 510 defines several levels of priorities system-wide. For example, it can have three levels of priorities defined and each device is assigned with one priority level. It can also have multiple levels of criticality and each device is assigned with one criticality level. It is possible to define only priority level or criticality level for each device, or define both.

The RAN load monitoring module 512 constantly monitors the current load at the radio access network and provides the current load condition to the early throttling decision module 513. RAN load monitoring module 512 also keeps a load level for throttling and constantly compares the current load and the defined load level for throttling. If the current load is higher than the defined load level for throttling, the RAN load monitoring module 512 provides this information to the early throttling module 513 so that the early throttling module 513 can start the throttling decision process. The RAN load monitoring module 512 may use hysteresis in comparing current load and the defined load level for throttling. The RAN load monitoring module 512 can also, in response to a request from early throttling decision module 513, provide the current system load to the early throttling decision module 513.

Once the RAN load monitoring module 512 decides the current load is higher than the pre-defined load level for throttling, RAN load monitoring module 512 sends the trigger to the early throttling decision module 513. Early throttling decision module 513 then starts the decision process for early throttling. Early throttling decision module 513 has statically or dynamically defined throttling behavior based on device characteristics. The term 'dynamically' is used herein to indicate that the throttling behavior could be different depending on various conditions, for example network conditions. This throttling behavior is defined per device priority level, current system load, and throttling level per priority level, etc. The early throttling module 513 uses the priority level and throttling level information and current system load trigger provided by RAN load monitoring module 512 to decide whether to throttle certain requests in order to utilize the radio network resource and the core network resource in an optimized way so that more high priority, critical devices are granted access to the network while throttling the low priority, non-critical devices with the same given resource. The throttling behavior is defined as how much percentage of the devices are throttled per priority level under congested network condition, as provided by RAN load monitoring module 512. In one embodiment, the early throttling decision module 513 has a rule to throttle 50% of low priority device by rejecting the access request when the system load is higher than 70%.

When RAN load monitoring module 512 decides the current load is higher than the threshold for early throttling, the module notifies the early throttling decision module 513 with this information and the early throttling decision module 513 start the throttling decision process. The early throttling decision module 513 sends the request to the mobility/session management module 515 so that the mobility/session management module 515 will forward all the following requests from the device to the early throttling decision module 513. Once the trigger is set at the mobility/session management module 515 by the early throttling decision module 513, the mobility/session management module 515 forwards all the following requests from the device to the early throttling decision module 513. When the early throttling decision module 513 receives a request from a device from mobility/session management module 515, the early throttling decision module 513 fetches the device characteristic from the device characteristic storage module 510 for the device that had initiated the request, and compares this device characteristic with the ones defined for throttling behavior. If the device characteristic matches with the one that is defined in the throttling behavior, the early throttling decision module 513 starts the process to decide whether to throttle this device or not. In one embodiment, early throttling decision module 513 has a rule to throttle 50% of low priority device during network congestion condition. When the early throttling is triggered, upon receiving the request from the device via mobility/session management module 515 and fetching the device characteristics from the device characteristic storage module 510, early throttling decision module 513 checks whether the device is low priority for which the throttling behavior is defined. If the device priority is higher than the throttling priority, the early throttling decision module 513 decides the throttling is not needed for this device and responds to the mobility/session management module 515 that it can proceed with the rest of the procedures for this device. The mobility/session management module 515 then proceeds with the rest of the procedures for the device without any further interaction with the early throttling decision module 513.

If, in the above embodiment, the device priority is equal to or lower than the throttling priority, the early throttling decision module 513 decides the throttling is needed for this device. In this case, the early throttling decision module 513 decides the throttling behavior for this device according to device characteristic and the throttling level. In the aforementioned embodiment, the rule is set to throttle 50% of low priority device and the early throttling decision module 513 will reject the request from the low priority devices with 1:2 ratio. Based on this behavior, the early throttling decision module 513 sends a response to a mobility/session management module 515 whether it can proceed with the request or it should reject the request and stop the procedure. For 50% throttling ratio, the early throttling decision module 513 sends reject request to a mobility/session management module 515 for every other request it receives from the low priority devices. As described here, early throttling decision module 513 would control the acceptance level of low priority devices to effectively increase the network resources for high priority devices without actually adding any more physical resources in the network, maximizing the resource utilization especially for high priority users.

The mobility/session management module 515 interacts with early throttling decision module 513 so that early throttling decision module 513 can make a decision on each request under network congested conditions and to process the request according to the decision made by early throttling decision module 513. When the early throttling decision module 513 decides the throttling is needed, it sends the trigger to the mobility/session management module 515 and with this trigger, the mobility/session management module 515 starts forwarding all the requests from all the devices to early throttling decision module 513. After the early throttling decision module 513 makes a decision whether to accept or reject the request, the early throttling decision module 513 sends a decision to the mobility/session management module 515 and the mobility/session management module 515 follows the direction provided by the early throttling decision module 513. If the decision was to accept the request, the mobility/session management module 515 proceeds with the requested procedure without any further interaction with the early throttling decision module 513 for this procedure. If the decision was to reject the request, the mobility/session management module 515 sends the reject response to the device and the resource at the mobility/session management module 515 becomes available for other devices.

Some portions of the preceding detailed descriptions have been presented in terms of methods and symbolic representations of operations on data bits within a computer memory. These descriptions and representations are the ways used by those skilled in the data processing arts to most effectively convey the substance of their work to others skilled in the art. The term method as used herein, and generally, is conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable medium. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

The methods and displays presented herein are not inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description above. In addition, embodiments of the present invention are not described with reference to any particular programming language. It will be appreciated that a variety of programming languages may be used to implement the teachings of embodiments of the invention as described herein.

Although process (or method) steps may be described or claimed in a particular sequential order, such processes may be configured to work in different orders. In other words, any sequence or order of steps that may be explicitly described or claimed does not necessarily indicate a requirement that the steps be performed in that order unless specifically indicated. Further, some steps may be performed simultaneously despite being described or implied as occurring non-simultaneously (e.g., because one step is described after the other step) unless specifically indicated. Moreover, the illustration of a process by its depiction in a drawing does not imply that the illustrated process is exclusive of other variations and modifications thereto, does not imply that the illustrated process or any of its steps are necessary to the embodiment(s), and does not imply that the illustrated process is preferred.

In this disclosure, devices that are described as in "communication" with each other or "coupled" to each other need not be in continuous communication with each other or in direct physical contact, unless expressly specified otherwise. On the contrary, such devices need only transmit to each other as necessary or desirable, and may actually refrain from exchanging data most of the time. For example, a machine in communication with or coupled with another machine via the Internet may not transmit data to the other machine for long period of time (e.g. weeks at a time). In addition, devices that are in communication with or coupled with each other may communicate directly or indirectly through one or more intermediaries.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

The invention claimed is:

1. A network element for throttling network traffic of a packet network system comprising:
   a network interface unit configured to send and receive communications from a plurality of mobile devices through a radio access network;
   a processor with a memory associated with the network interface unit and adapted to:
   monitor the network traffic load at the radio access network;
   start an early throttling decision process for the plurality of mobile devices when the network traffic load reaches a pre-defined network traffic load level;
   receive an attach request from at least one of the plurality of mobile devices and check characteristic information of the at least one mobile device; and
   if the characteristic information of the at least one mobile device is at the throttling level for the at least one mobile device, make a determination whether to proceed with the attach request or deny the attach request,
   wherein the characteristic information includes a plurality of priority levels; and the pre-defined throttling level is a changeable percentage throttle rate for each priority level depending on the ratio of low priority to high priority mobile devices requesting attachment.

2. A network element of claim 1, wherein the processor is further adapted to:
   store characteristic information for each of the plurality of mobile devices; and
   pre-define the network traffic load level to start early throttling and a throttling level for the mobile devices for each level of a plurality of priority levels.

3. The network element of claim 2, wherein the characteristic information includes a priority level and a criticality level of at least one of the plurality of mobile devices.

4. The network element of claim 2, wherein when the mobile device is at the throttling level, proceed or deny the attach request depending on a predetermined throttling rate for the throttling level.

5. The network element of claim 2, wherein the characteristic information includes a plurality of priority levels; and the throttling level is a pre-defined percentage throttle rate for each priority level.

6. The network element of claim 2, wherein the network element is located in a SGSN or MME or SAE-GW.

7. A method performed with a network element having an access network unit interface, a processor and memory, said network element configured to process network signaling of a packet core network, the method comprising
   monitor the network traffic load at a radio access network;
   start an early throttling decision process for the plurality of mobile devices when the network traffic load reaches a pre-defined network traffic load level;
   receive an access request from at least one of the plurality of mobile devices and check characteristic information of the at least one mobile device; and
   if the characteristic information of the at least one mobile device is at a throttling level for the at least one mobile device, trigger early throttling for the at least one mobile device,
   wherein the characteristic information includes a plurality of priority levels; and the throttling level is a percentage throttle rate for each priority level which depends on the ratio of low priority devices to high priority devices.

8. The method of claim 7, wherein the characteristic information includes a plurality of priority levels; and the throttling level is a pre-defined percentage throttle rate for each priority level.

9. The method of claim 7, wherein the pre-defined network traffic load level is based on a plurality of factors including: current network traffic load and ratio of low priority devices and high priority devices.

* * * * *